June 8, 1965 C. F. AULT 3,188,477

LIGHT BEAM POSITIONING SYSTEM

Filed Aug. 17, 1961 2 Sheets-Sheet 1

INVENTOR
C.F. AULT
BY

ATTORNEY

June 8, 1965 C. F. AULT 3,188,477

LIGHT BEAM POSITIONING SYSTEM

Filed Aug. 17, 1961 2 Sheets-Sheet 2

INVENTOR
BY C.F. AULT

R. C. Winter
ATTORNEY 3,188,477
LIGHT BEAM POSITIONING SYSTEM
Cyrus F. Ault, Lincroft, N.J., assignor to Bell Telephone Laboratories, Incorporated, New York, N.Y., a corporation of New York
Filed Aug. 17, 1961, Ser. No. 132,232
12 Claims. (Cl. 250—217)

This invention relates to beam positioning systems and more particularly to systems for the positioning of a beam produced in a cathode ray device.

For various applications utilizing cathode ray tubes it is desirable to achieve rapid and accurate positioning of the electron beam on a discrete area of a target surface in order to assure that the beam position, or at least a coordinate of this position, is maintained for a prescribed period of time and to reposition the beam to the desired position should it fail to impinge it exactly in response to the initial positioning circuitry.

Such a positioning system lends itself to storage systems of the type disclosed in R. C. Davis and R. E. Staehler Patent 2,830,285, issued April 8, 1958. In such a system information is stored on photographic slides in the form of transparent and opaque discrete areas, each area representing a binary code bit of information. The information storage slides are positioned in front of a cathode ray tube having a luminescent surface such that the electron beam directed to a discrete area of the luminescent surface forms a light spot which in turn is focused on one of the discrete areas of each of the information storage slides. Light-sensitive devices behind the storage slides convert light passing through the storage slides into electrical signals and pass such signals to an output circuit.

In order to realize the exacting requirements of beam positioning in such a system, the cited patent employs a feedback loop between light-sensitive devices, arranged to receive light through positioning slides, and the cathode ray tube deflection circuit. The positioning slides contain alternate opaque and nonopaque bands, and light passing through the nonopaque bands results in a corresponding electrical signal of proportionate size to be produced by the light-sensitive devices. This signal is compared with a reference signal equivalent to that produced by the amount of light which should pass through the nonopaque bands in order to position the beam on a borderline with an opaque band. The electron beam is repositioned by the output of this signal comparing means until the output of the light-sensitive devices and the reference signal are at the same level.

Various light-sensitive devices known in the art have been employed in this capacity including photocells and photomultiplier tubes. Unfortunately, the gain of such devices is particularly sensitive to variations in applied control voltages, thus requiring an extremely stable voltage source or means for controlling the source in order to compensate for gain variations. Furthermore, light-sensitive devices are characteristically subject to aging effects; i.e., deterioration in gain with use over a period of time.

Of course, successful operation of the instant beam positioning system is vitally concerned with the precise operation of the light-sensitive devices. Thus the gain factor is critical; e.g., if the gain of the light-sensitive means changes, the light beam will be moved more or less into the opaque band of the positioning slide so as to preserve the requisite match in compared output voltages. Such erroneous positioning, due to changes in gain, ultimately affects the operating margins of the entire system and may be responsible for an increase in the error rate.

Various methods have been proposed in the past for solving this gain stability problem, many of which rely for their operation upon the utilization of extremely accurate voltage sources or monitoring apparatus to effect gain comparisons. In accordance with my invention, the gain stabilization problem is eliminated without sacrificing the sensitivity of the beam positioning system.

It is, therefore, a general object of my invention to provide an improved beam positioning system.

It is a more particular object of my invention to provide a beam positioning system which operates independently of the gain provided by light-sensitive devices.

Thus it is another object of my invention to provide a rugged, reliable and economical beam positioning system.

These and other objects of my invention are attained by the employment of positioning means facing the luminescent screen of a cathode ray tube. Optical means are provided therebetween to focus light emanating from the tube surface on the positioning means, and light-sensitive devices are positioned to receive light passing through the positioning means and thereafter to convert it into electrical impulses. Feedback paths emanating from the light-sensitive devices are connected to the input circuit of the cathode ray tube such that in the presence of electrical signals from the light-sensitive means at a particular time, the cathode ray tube deflection system will be activated to reposition the electron beam.

In accordance with one embodiment of this invention, the positioning means comprises a slide having a plurality of opaque areas spaced apart by transparent areas and arranged in staggered relationship in two columns such that light focused in a plane across the columns impinges wholly upon at least one of the opaque areas. Stated another way, if light from the source were focused in two distinct light beams and each beam directed in the same horizontal plane at a corresponding one of two distinct vertical columns, at least one of the two light beams at any point in the vertical sweep would be blocked by an opaque area in the corresponding column. At particular predetermined beam positions, both light beams will impinge wholly upon corresponding opaque areas in the respective columns so that no light will reach the light-sensitive devices.

Further in accordance with this embodiment of the invention, a pair of light-sensitive devices such as photocells are employed, each receiving light through a corresponding one of the columns. The desired predetermined beam positions are thus achieved when the light fails to penetrate either of the positioning columns, and the pair of photocells consequently fail to provide any output indication. This in turn removes any servo positioning signal provided by the photocells from the cathode ray tube deflection circuitry.

Such an arrangement provides accurate repositioning in one beam deflection coordinate, and a similar scheme may be employed in the opposite coordinate in order to realize any desired position in space.

In accordance with another embodiment of this invention, the positioning means comprises a slide having spaced apart opaque bands and intermediate color filter bands to form a sequence such as, for example, red, black, green, black, red, et cetera. Light transmitted through this slide is filtered; that passing through the red band going to one photocell and that passing through the green band to another photocell. The output circuitry connected to the photocells is ararnged such that the outputs drive the servo positioning circuit in opposite directions and the null, or zero, drive position is realized again when no light is received by either photocell.

It is, therefore, a feature of this invention that a positioning system utilize positioning means which permit light from a light source to reach light-sensitive devices only when the light source is not properly positioned.

It is a more specific feature in accordance with one embodiment of this invention that light from the source be focused on a positioning slide comprising opaque areas spaced apart by transparent areas, arranged in distinct columns, and staggered such that at no predetermined position of the source may the light from the source traverse both columns simultaneously.

It is a more specific feature in accordance with another embodiment of this invention that light from the source be focused on a positioning slide comprising a sequence of distinct color filter bands alternating with opaque bands, the latter corresponding to the desired source positions, and filter means for directing light transmitted through a particular band of the positioning slide to a corersponding light-sensitive device.

A complete understanding of this invention and of the above-noted and other features thereof may be gained from consideration of the following detailed description and the accompanying drawing, in which.

Figure 1:
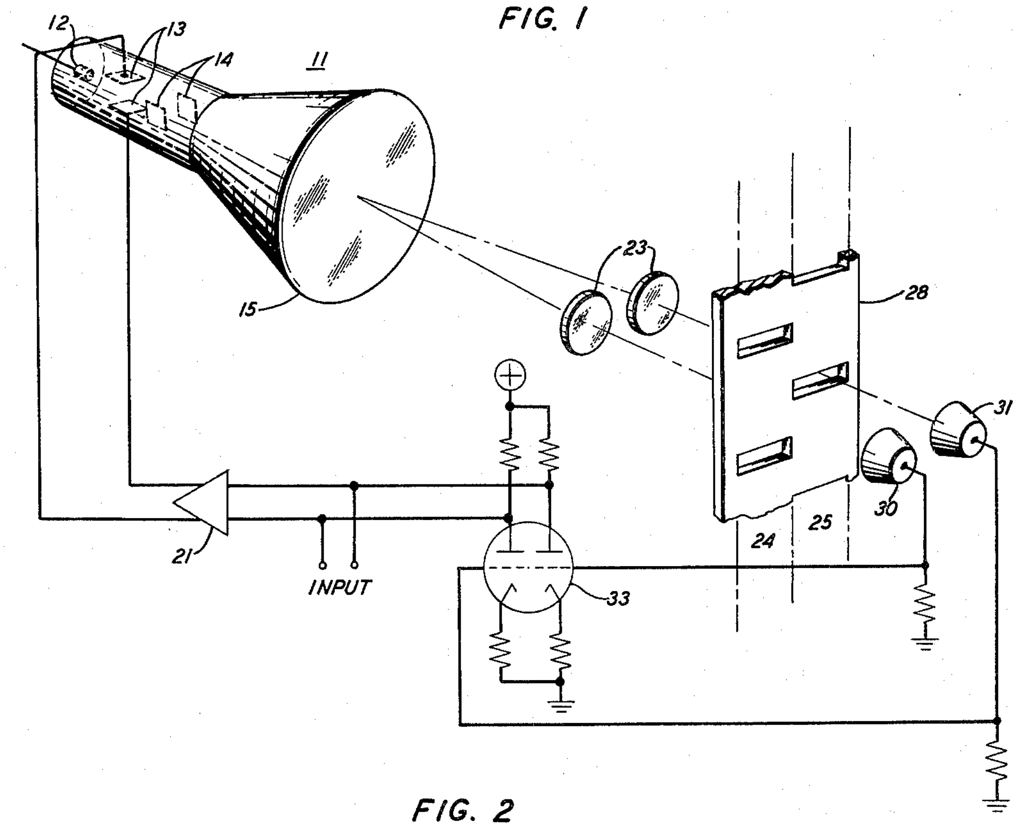
FIG. 1 is a representation, mainly in block form, of one specific illustrative embodiment of this invention.

Referring now to FIG. 1 of the drawing, the specific illustrative embodiment of this invention there depicted includes as a light source a cathode ray tube comprising an evacuated enclosing vessel 11, having at one end an electron gun 12. The electron gun 12 produces a concentrated electron beam which is projected centrally between two pairs of deflection plates 13 and 14 and against a target surface 15 which forms the face of the cathode ray tube and is coated with a luminescent material.

The deflection plates 13 and 14, mounted in space quadrature, are energized from horizontal and vertical deflection circuits through deflection amplifiers, such as 21 serving the vertical deflection circuit, and may be of any of a number of circuits capable of converting binary information to analog representations, the binary information indicating the desired beam position in each coordinate. Amplifier 21 supplies voltages to the deflection plates 13, representing a summation of analog values in that deflection circuit.

The electron beam is deflected in accordance with the applied voltages so that it impinges a desired discrete area of the surface 15 and produces a spot of light thereat. Advantageously, a lens system 23 is positioned behind the surface 15 to focus the resultant light on corresponding positions in the distinct columns 24 and 25 of slide 28. Each of the columns 24 and 25 contains a plurality of opaque areas spaced apart by transparent areas and particularly arranged in each column in staggered relationship to the opaque areas in the other column such that if columns 24 and 25 were superimposed, the top and bottom edges of corresponding opaque areas would overlap by an amount corresponding to at least the diameter of the impinging light beam. These areas of overlap constitute the desired positions A, FIG. 2, to which the beam may be servoed.

Figure 2:
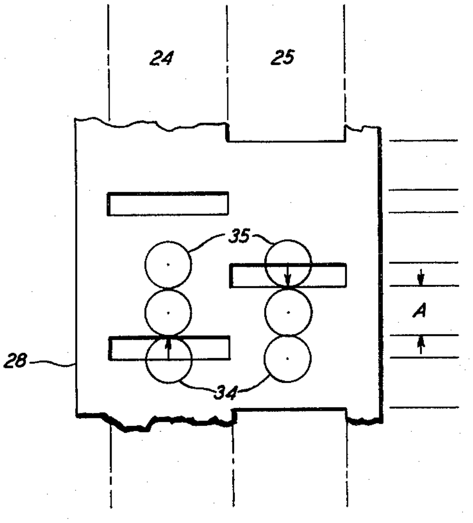
FIG. 2 is an exploded view of the positioning slide in the system according to FIG. 1.

This arrangement may readily be seen in the exploded view of FIG. 2. Advantageously for ease of construction and positioning, the opaque areas may be incorporated into the unitary structure of slide 28 so that only the areas intermediate the opaque areas in each of the columns 24 and 25 are transparent. The resulting structure will serve to position the beam in the vertical direction and is thus designated as the vertical address positioning slide. A similar structure in which the opaque areas are arranged in parallel rows may be employed to position the beam in the horizontal coordinate and thus would be designated the horizontal address positioning slide.

A pair of light-sensitive devices such as photocells 30 and 31, FIG. 1, is positioned to receive light passing through columns 24 and 25, respectively, of the positioning slide 28. The outputs of the devices 30 and 31 are fed back through a difference amplifier 33, as known in the art, to the deflection circuitry in the corresponding coordinate, in this instance the vertical coordinate, to reposition the electron beam.

Assume, for example, that the positioning circuitry produces a light beam focused initially on position 34 of slide 28, FIG. 2. Since position 34 is wholly within the opaque area of column 25 but partially within the transparent area in column 24, photocell 30, FIG. 1, will receive light but photocell 31 will not. The output signal produced by the photocell 30 will produce a deflection signal at the cathode ray tube 11, serving to drive the electron beam upward in this instance. The resultant light beam will ultimately impinge target 28 in the desired, predetermined band A, in which position no light is received by either photocell 30 or 31, and the beam is locked.

If during the servoing process the beam should overshoot the desired position A, light would be received only through column 25 at photocell 31, as indicated by position 35 in FIG. 2. In this instance a signal would be produced which serves to drive the beam in the opposite direction. Ultimately the beam will settle in the desired servo position, at which no light will be received by either photocell.

Detection of the signals produced by the photocells thus results in an output continuing to drive the beam until no light is received thereat. At this precise point, the output of the difference amplifier 33 is zero, and the beam is locked to the opaque band of the positioning slide. The direction of drive produced by light received at photocell 30 or 31 through column 24 or 25, respectively, is discretionary so long as drive is in opposite directions for the two columns. In this fashion the beam may be directed to any one of a plurality of predetermined opaque bands across both columns of the positioning slide 28.

Similarly, a second slide and associated photocells may be employed to direct the beam to any one of a plurality of opaque bands in the opposite coordinate. Thus the ultimate beam position may be defined by the intersection determined by the coordinate opaque bands on each of the positioning slides.

It may be noted that in no instance are both of the photocells 30 and 31, FIG. 1, activated simultaneously. This is due to the particular design of the slide 28, FIG. 2, in which the adjacent transparent windows are separated by at least one beam width. In this fashion it is possible to utilize photocells of varying gain characteristics indiscriminately in that the final desired beam position is entirely independent of the photocell gain, coming as it does at a point when the photocells are both inactive. Since positioning of the beam must be accurate at any deflection for a successful operation of the positioning scheme, the system must be entirely independent of such gain considerations as well as local variations in beam size, intensity and distribution which may occur, due in part to variations in the phosphor output at various points on the cathode ray tube screen. Such considerations may readily be taken into account by designing the slide 28 with sufficient spacing intermediate the transparent windows to accommodate such variations.

Figure 4:
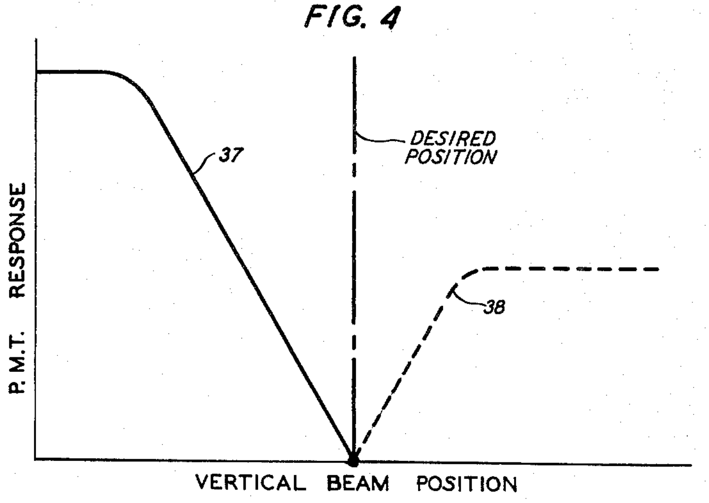
FIG. 4 is a graph indicating the operation of the light-sensitive devices of the system having various gain characteristics.

FIG. 4 illustrates the solution of the gain problem by this invention. In order to attain a desired predetermined beam position, it is required merely that no light be received through the positioning slide 28 by either of the photocells 30 and 31 positioned therebehind. Since one of the photocells can receive light only through the windows in one of the vertical columns and the other of the pair only through the windows in the other vertical column, positioning on an opaque area intermediate adjacent windows of the positioning slide is achieved only when the light inputs to the photocells are both zero. A light beam impinging position 34 or position 35, FIG. 2, will be driven into the opaque band A between them despite variations in gain of the photocells or the intensity of the beam. Thus with the beam in position 34, photocell 30 is activated and, as indicated in FIG. 4, the gain produced by the photocell 30 may be at any level, such as 37, and the servo system will still drive the beam upward toward the opaque band A.

Similarly, with the beam in position 35 and light impinging photocell 31, the gain of photocell 31 may be at any level such as 38, for example, distinct from the gain of photocell 30, and the beam will nevertheless be driven downward toward the desired opaque band A. When this position is achieved, the output of each photocell 30 and 31 is zero, as indicated at the null point in FIG. 4, and the beam is locked to the desired position.

Figure 3:
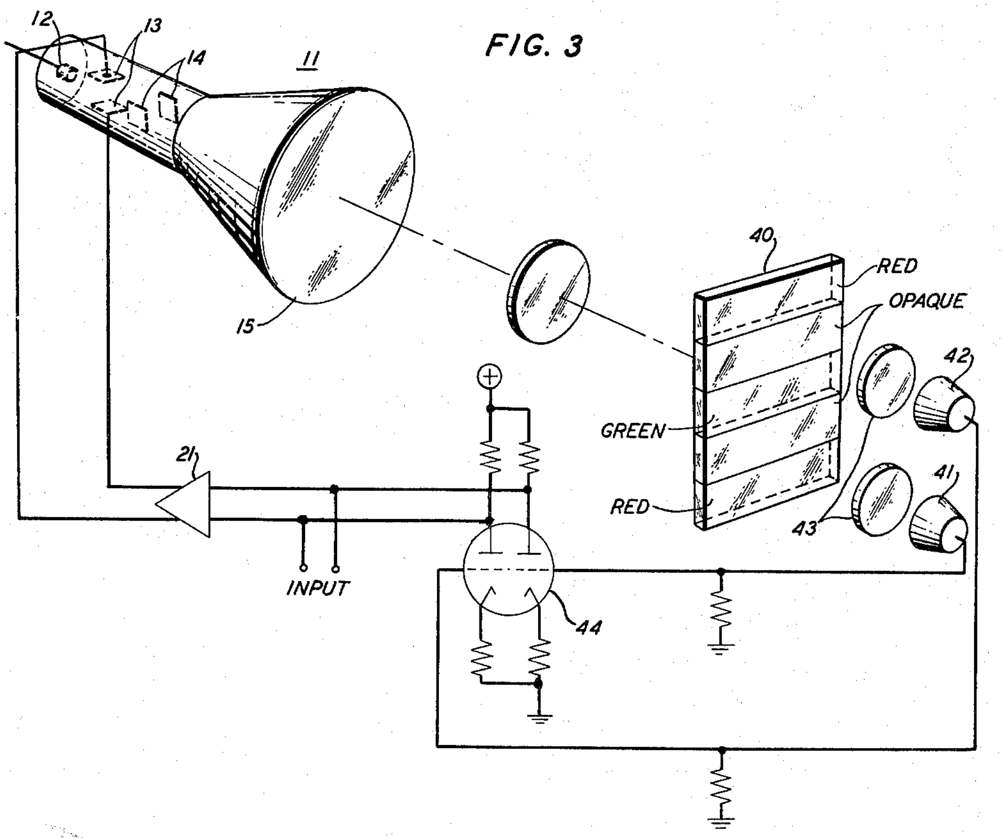
FIG. 3 is a representation, mainly in block form, of another specific illustrative embodiment of this invention.

In accordance with another embodiment of this invention, as indicated in FIG. 3, the positioning slide 40 comprises spaced apart opaque bands with bands of distinct light transmission characteristics intermediate the opaque bands. A single light beam is focused upon the slide 40 for each coordinate in the positioning system. Consider, for example, that the slide 40 comprises a sequence of bands, as indicated in FIG. 3, including the colors red, black, green, black, red, black, et cetera, in this instance black corresponding to the opaque bands. Light coming through the positioning slide 40 is filtered by slides 43 positioned immediately in front of each of the photocells 41 and 42. Thus light transmitted through the red band is filtered and transmitted only to photocell 41, while the light transmitted through the green band is filtered and transmitted only to photocell 42. The outputs of the photocells are applied to the difference amplifier 44 in such a manner as to result in a drive of the beam in opposite directions when applied through the servo system to the cathode ray tube 11. The null position is once again the desired position with the beam focused on an opaque band. At this point, of course, no light is received by either photocell and their outputs consequently are zero.

In addition to the advantages accruing from a system independent of photocell gain, it is apparent also that utilization of the instant system will result in a vestly increased life expectancy of the photocells employed in that during operation they are receiving no light for the majority of the time.

It is to be understood that the above-described arrangements are illustrative of the application of the principles of the invention. Numerous other arrangements may be devised by those skilled in the art without departing from the spirit and scope of the invention.

What is claimed is:

1. A system for positioning light on any one of a plurality of preselected positions comprising a light source, target means having at least two distinct sets of individual light-pervious areas, adjacent ones of said light-pervious areas being separated by opaque areas each corresponding to one of said preselected positions for said light source, means independent of said target means for focusing light from said source on said target means, a plurality of light-sensitive means each for producing signals only in response to the receipt of light from said source through any individual light-pervious area in a corresponding one of said sets of light-pervious areas, and means operative in response to the receipt of said signals for altering the position of said light source until the light focused on said target means impinges wholly on one of said opaque areas and fails to reach said light sensitive means.

2. A positioning system in accordance with claim 1 wherein said sets of light-pervious areas comprise transparent areas arranged in distinct columns and wherein said focusing means comprises means for focusing light from said source on each of said distinct columns.

3. A positioning system in accordance with claim 1 wherein each of said sets of light-pervious areas comprises color filter regions capable of transmitting light contained in a distinct wavelength band.

4. A positioning system in accordance with claim 3 wherein said light-sensitive means comprises a plurality of light-sensitive devices each corresponding to one of said color filter sets and further comprising means positioned between said target means and said light-sensitive devices for transmitting light only to a distinct one of said devices received through any one of said color filter regions of a corresponding set.

5. A system for positioning light on any one of a plurality of preselected positions comprising a light source, means for initially positioning said source, and means for causing said source to occupy a final one of said predetermined positions comprising a target fixed in space, said target comprising distinct sets of light-permeable areas and a plurality of opaque areas each representing one of said final positions, a first light-sensitive device for producing electrical signals in response to the receipt of light transmitted through any one of said light-permeable areas of a first one of said sets, a second light-sensitive device for producing electrical signals in response to the receipt of light transmitted through any one of said light-permeable areas of another one of said sets, and means connected between said initial positioning means and said first and second light-sensitive devices and responsive to said electrical signals for adjusting the position of said light source until all of the resultant light fails to reach said first and second light-sensitive devices through said target.

6. A system for positioning light on any one of a plurality of preselected positions comprising a light source, a positioning slide comprising a plurality of sets of discrete areas adapted to transmit light, means independent of said slide for focusing light from said source on said slide and for directing said light into a plurality of distinct light beams, a plurality of light-sensitive devices each positioned to receive light from a different one of said light beams through any area in a corresponding set of discrete light-transmitting areas of said slide, and means for repositioning said source independent of the gain of said light-sensitive devices comprising means responsive to output signals from each of said light-sensitive devices for moving said source in different directions, and means in said positioning slide for intercepting all of the light from said source focused on said slide when said source is moved to one of said predetermined positions.

7. A positioning system in accordance with claim 6 wherein said positioning slide also comprises means for permitting light from said source to impinge no more than one of said light-sensitive devices at one time.

8. A positioning system in accordance with claim 7 wherein said positioning slide comprises distinct columns of said light-transmitting areas spaced apart by opaque areas, the opaque areas being arranged in staggered relationship in adjacent columns.

9. A positioning system in accordance with claim 8 wherein a distinct one of said light-sensitive devices is positioned to receive light from a particular one of said beams through any light-transmitting area of only a corresponding one of said positioning slide columns.

10. A positioning system in accordance with claim 7 wherein said positioning slide comprises a plurality of opaque areas interleaved with said light-transmitting areas and wherein said light-transmitting areas comprise translucent bands on opposite sides of each opaque band and having distinct light transmission characteristics.

11. A position system in accordance with claim 10 and further comprising means for transmitting light to a corresponding one of said light-sensitive devices only in the wavelength band of a corresponding one of said translucent bands.

12. An electrical circuit comprising an electron discharge device having a luminescent surface, means for projecting an electron beam against said surface, a plurality of deflecting means each effective for deflecting said electron beam in a different direction so as to produce a spot of light at any one of a plurality of distinct locations on said surface, optical means for directing the light emanating from said spot into a plurality of distinct light beams, and means for correcting the deflection of said electron beam comprising means coupled to each of said deflecting means and effective for generating electrical signals in response to the receipt of light, said light responsive means being positioned to receive a particular one of said light beams transmitted thereto through said optical means from said surface, means for blocking the transmission of any light from a selected one of said distinct locations on said surface to said light responsive means, and means connected to said light responsive means and responsive to said electrical signals for applying correction signals to said deflection means to reposition said electron beam until all of said electron beam impinges said selected location on said surface and the transmission of any light to said light responsive means is blocked.

References Cited by the Examiner

UNITED STATES PATENTS

| | | | |
|---|---|---|---|
| 2,079,446 | 5/37 | Goldsmith | 250—217 |
| 2,220,737 | 11/40 | Jones | 250—237 X |
| 2,455,532 | 12/48 | Sunstein | 250—201 |
| 2,742,631 | 4/56 | Rajchman et al. | 250—71 |
| 2,851,521 | 9/58 | Clapp | 250—217 |
| 2,945,187 | 7/60 | McCollom | 250—209 X |
| 2,994,072 | 7/61 | Woody | 250—219 |
| 3,012,469 | 12/61 | Clayborne | 250—209 X |

RALPH G. NILSON, *Primary Examiner.*

ARCHIE R. BORCHELT, *Examiner.*